United States Patent
Yokoi (10) Patent No.: US 8,714,487 B2
(45) Date of Patent: May 6, 2014

(54) COCKPIT WINDOW OF AIRCRAFT HAVING ELECTROMAGNETIC SHIELD, AND AIRCRAFT

(75) Inventor: Takashi Yokoi, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 0 days.

(21) Appl. No.: 13/496,105

(22) PCT Filed: Jan. 24, 2011

(86) PCT No.: PCT/JP2011/000365
§ 371 (c)(1),
(2), (4) Date: Mar. 14, 2012

(87) PCT Pub. No.: WO2011/132349
PCT Pub. Date: Oct. 27, 2011

(65) Prior Publication Data
US 2013/0026296 A1    Jan. 31, 2013

(30) Foreign Application Priority Data
Apr. 19, 2010    (JP) .................. 2010-095810

(51) Int. Cl.
*B64C 1/14*    (2006.01)
(52) U.S. Cl.
USPC ...................................................... 244/129.3
(58) Field of Classification Search
USPC .................... 244/129.1, 129.3; 174/381, 389; 359/275
See application file for complete search history.

(56) References Cited

U.S. PATENT DOCUMENTS

| | | | | |
|---|---|---|---|---|
| 4,874,903 A | * | 10/1989 | Clarke | 174/389 |
| 5,139,850 A | * | 8/1992 | Clarke et al. | 428/192 |
| 5,147,694 A | * | 9/1992 | Clarke | 428/34 |
| 6,787,204 B2 | * | 9/2004 | Chaussade et al. | 428/34 |
| 6,921,859 B2 | * | 7/2005 | Hikita et al. | 174/381 |
| 2003/0087048 A1 | * | 5/2003 | Chaussade et al. | 428/34 |
| 2004/0229607 A1 | * | 11/2004 | La Chapelle et al. | 455/431 |
| 2005/0039936 A1 | * | 2/2005 | Hikita et al. | 174/35 R |

FOREIGN PATENT DOCUMENTS

| | | |
|---|---|---|
| JP | 01-204895 A | 8/1989 |
| JP | 02-204197 A | 8/1990 |

(Continued)

OTHER PUBLICATIONS

International Search Report for PCT/JP2011/000365; Feb. 15, 2011.

(Continued)

*Primary Examiner* — Philip J Bonzell
(74) *Attorney, Agent, or Firm* — Pearne & Gordon LLP (57) ABSTRACT

There is provided a cockpit window of an aircraft and the aircraft in which an electromagnetic shield film for preventing electromagnetic noise can be reliably and easily provided at low cost. An electromagnetic shield film is provided to a window part, and a conductive film is provided between the electromagnetic shield film and an outer retainer made of a conductive material. The conductive film is connected to the electromagnetic shield film via a connecting member is provided so as to be led to an outer perimeter side of the window part along an outer perimeter part of the window part, and is electrically connected to the outer retainer. With this configuration, a film made of a conductive material is formed without a gap at a joint portion between the window part and the outer retainer. Also, the conductive film is assumed to have flexibility.

9 Claims, 5 Drawing Sheets

(56) References Cited

FOREIGN PATENT DOCUMENTS

| | | |
|---|---|---|
| JP | 11-084041 A | 3/1999 |
| JP | 11-097878 A | 4/1999 |
| JP | 2000-286591 A | 10/2000 |
| JP | 2003-523911 A | 8/2003 |
| JP | 2004-359221 A | 12/2004 |
| JP | 2008-201206 A | 9/2008 |
| JP | 2009-518214 A | 5/2009 |

OTHER PUBLICATIONS

International Preliminary Report on Patentability for PCT/JP2011/000365; Jan. 24, 2011.

Japanese Office action for patent application No. 2010-095810 dated Sep. 18, 2013.

* cited by examiner

COCKPIT WINDOW OF AIRCRAFT HAVING ELECTROMAGNETIC SHIELD, AND AIRCRAFT

TECHNICAL FIELD

The present invention relates to a cockpit window of an aircraft having an electromagnetic shield, and to the aircraft.

BACKGROUND ART

Aircraft have to be able to fly in safety without occurrence of a malfunction, an unforeseen behavior (up-set), or others in High Intensity Radiated Fields (HIRF), which represents an electro-magnetic environment from radio, television, radar, emitters, and other sources during cruising flight or during takeoff or landing. To this end, HIRF protection measures required in (14 CFR) sections 23.1308, 25.1317, 27.1317, and 29.1317 of High-intensity Radiated Fields (HIRF) protection, which stipulate regulations (airworthiness requirements) of Federal Aviation Administration (FAA), have to be taken.

The importance of protection of electric/electronic systems of aircraft has been significantly increasing in recent years for the following reasons:
1) a greater dependence on electric/electronic systems performing functions required for continued safe flight and landing of the aircraft;
2) a decrease in electromagnetic shielding by a composite material of some kind for use in designing aircraft;
3) an increase in susceptibility (sensitivity) to HIRF of electric/electronic systems accompanied by a higher speed of the operating speed of a data bus and a processor, a higher-density of an IC and a card, and a higher degree of sensitivity of electronic equipment;
4) an expansion of use frequency to a high-frequency band of, in particular, 1 GHz and higher;
5) an increase in severity of an HIRF environment with an increase in the number of RF transmitters and electric power; and
6) an adverse affect on part of aircraft when exposed to HIRF environment.

On the other hand, inside an aircraft, due to radio wave and electromagnetic noise (hereinafter simply referred to as electromagnetic noise) emitted from various electronic equipment, such as portable telephones, game machines, notebook-sized personal computers, and PEDs (Personal Electro Devices), such as an active-type RFID (Radio Frequency IDentification) tag attached to air freight cargo, an adverse effect can occur in, for example, communications with a control tower and communications and control of navigation for flight via a predetermined route. Thus, as well known, passengers are asked to refrain from using various electronic equipment inside aircraft.

Since the airframe of an aircraft is generally formed of metal, electromagnetic noise comes and goes from a cabin (a seat space) to a cockpit (a flight deck) and an avionics bay mainly through a cabin window and a cockpit window. Thus, in order to prevent electromagnetic noise that can be a hindrance from entering the cockpit and the avionics bay, a film made of ITO (Indium Tin Oxide), gold, silver, or the like is provided as being inserted to the cabin window made by laminating a plurality of window panels made of acrylic or the like (for example, refer to Patent Document 1).

CITATION LIST

Patent Document

Patent Document 1: Japanese Unexamined Patent Application Publication (Translation of PCT Application) No. 2003-523911

SUMMARY OF THE INVENTION

Technical Problems to be Solved by the Invention

On the other hand, in the cockpit window, a heater formed of a film also made of ITO, gold, silver, or the like has already been inserted for anti-icing or de-fogging. Thus, it can be thought that the film configuring this heater is used to prevent electromagnetic noise from entering. In an outer perimeter part of the window, a metal-made retainer mounting frame is integrally provided, and this mounting frame is fixed by a fastener to a window frame made of a metal (conductive) material provided on an airframe side, thereby mounting the cockpit window on the airframe. However, since the heater film is required to be electrically insulated, if an electrical space is present between the heater film and the fixing frame, electromagnetic noise enters the inside of the cockpit from this space. To prevent this entering, a connection is required to be reliably made between the film and the fixing frame at this part. However, consideration is not taken to that extent because the technology disclosed in Patent Document 1 is targeted for a cabin window.

Also, the cockpit window includes a main windshield on a front side and side widows positioned on its sides. And, the film described above is provided mainly for anti-icing in the main windshield and for de-fogging in the side windows. For this reason, a resistance value required for a de-fogging heater makes a heater film thin, and therefore a sufficient electromagnetic-shield attenuation effect cannot be obtained. Moreover, while the cockpit window has at least an outer layer formed of glass because a wiper is used to wipe off raindrops and others, the other layers are not necessarily formed of glass but may also be formed of acrylic or the like.

As such, the application of the film, the material of the window panels and their multilayered structure, and others can be different between the main windshield and the side windows. Therefore, as described above, each connection between the film and the fixing frame has a dedicated structure in each of the main windshield and the side windows, leading to an increase in cost.

Still further, for fastening the plurality of window panels and fixing them to the mounting frame, the outer perimeter part may be fastened with a fastener. Here, when the window panels are made of glass, in order to prevent the occurrence of a crack in the window panels due to the fastening force of the fastener, a portion where the outer perimeter part of the window panels are fastened with the fastener is formed of a material softer than glass (for example, a fiber glass). With this, this portion is deformed by the fastening force of the fastener and, as a result, there is a possibility that the film may fall off.

The present invention is devised based on these technical problems, and has an object of providing a cockpit window of an aircraft and the aircraft in which a film for preventing electromagnetic noise can be reliably and easily provided at low cost.

Solution to the Problems

For that object, a cockpit window of an aircraft having an electromagnetic shield according to the present invention includes a plurality of laminated transparent widow panels, an inner-side inner retainer and an outer-side outer retainer made of a conductive material, the retainers provided to an outer perimeter part of the window panels and interposing the window panels, a coupling member coupling the inner retainer and the outer retainer to each other, a weather seal provided between the outer retainer and the window panels, an electromagnetic shield film provided between two of the window panels that are opposed to each other and made of a conductive material, and a connecting film made of a conductive material and electrically connecting an outer perimeter part of the electromagnetic shield film and the outer retainer.

As such, by connecting the outer perimeter part of the electromagnetic shield film provided between two window panels opposed to each other and the outer retainer made of the conductive material with the connecting film, the electromagnetic shield film and the outer retainer can reliably become conductive.

Furthermore, preferably, the connecting film has one end interposed between two of the window panels that are opposed to each other to be electrically connected to the electromagnetic shield film and has another end connected to the outer retainer outside the window panels, and an intermediate part between the one end and the other end is along an outer perimeter surface of the window panels and is provided so as to fill a space between the outer perimeter part of the electromagnetic shield film and the outer retainer. With this, electromagnetic noise can be prevented from entering from a space between the outer perimeter part of the electromagnetic shield film and the outer retainer.

At this time, the electromagnetic shield film can be provided on an inner perimeter side from a portion fastened by the inner retainer and the outer retainer and the connecting film can be inserted in the portion. With this, the fastening force by the inner retainer and the outer retainer can be prevented from acting on the electromagnetic shield film, thereby preventing the electromagnetic shield film from falling off even in the case where the outer perimeter part of the window panel is formed of a material softer than glass.

The connecting film and the electromagnetic shield film can be connected via a band-shaped connecting member provided so as to surround the outer perimeter part of the electromagnetic shield film, the connecting member being made of a conductive material. As this connecting member, a braided wire can be used.

Still further, a heater layer for anti-icing or de-fogging can further be provided between the plurality of window panels.

The present invention can be directed to an aircraft including the cockpit window having the electromagnetic shield as described above.

Advantageous Effects of Invention

According to the present invention, with a simple structure such that the outer perimeter part of the electromagnetic shield film provided between two window panels that are opposed to each other and the outer retainer made of the conductive material are connected with the connecting film, the space between the electromagnetic shield film and the outer retainer is electrically filled, and entrance of radio waves and electromagnetic noise from the space between the outer perimeter part of the electromagnetic shield film and the outer retainer can be prevented.

Also, even when a portion of the outer perimeter part of the window panel to be fastened with the fastener is formed of a material softer than glass, the electromagnetic shield film can be prevented from falling off due to the fastening force of the fastener.

As such, the electromagnetic shield film for preventing electromagnetic noise can be reliably and easily provided at low cost. Also, with the electromagnetic shield film being interposed between the laminated window panels, flaws due to dust, bounced stone, and others and friction by a wiper do not have an influence, thereby eliminating the need of maintenance at the time of maintaining the airframe.

DESCRIPTION OF EMBODIMENT

The present invention will now be described in detail based on an embodiment shown in the accompanying drawings.

Figure 1:
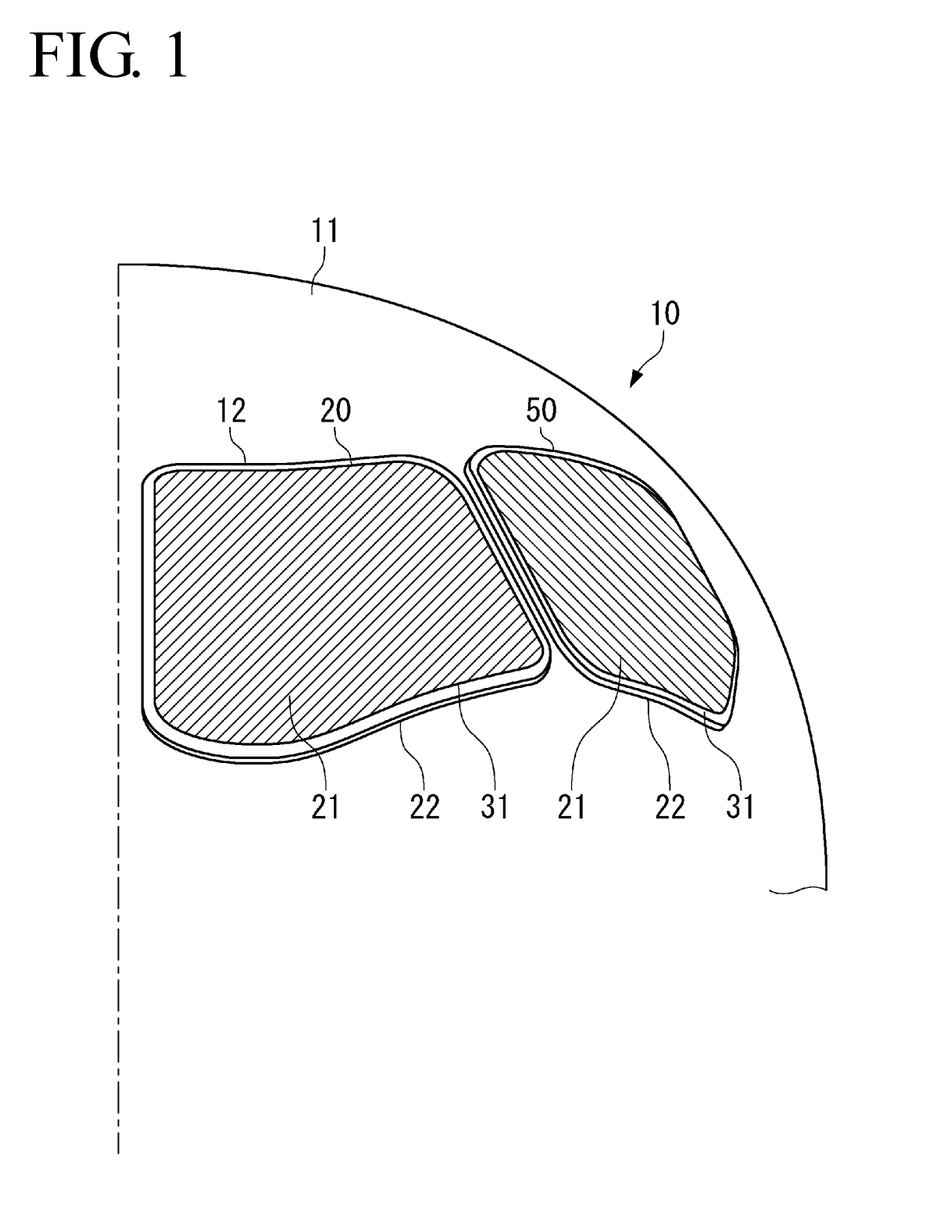
FIG. 1 is a view of a cockpit portion of an aircraft in the present embodiment.

FIG. 1 is a view for describing the structure of a cockpit window 20 of an aircraft 10 in the present embodiment.

As shown in FIG. 1, the cockpit window (main windshield) 20 is provided ahead of a cockpit of the aircraft 10.

Figure 2:
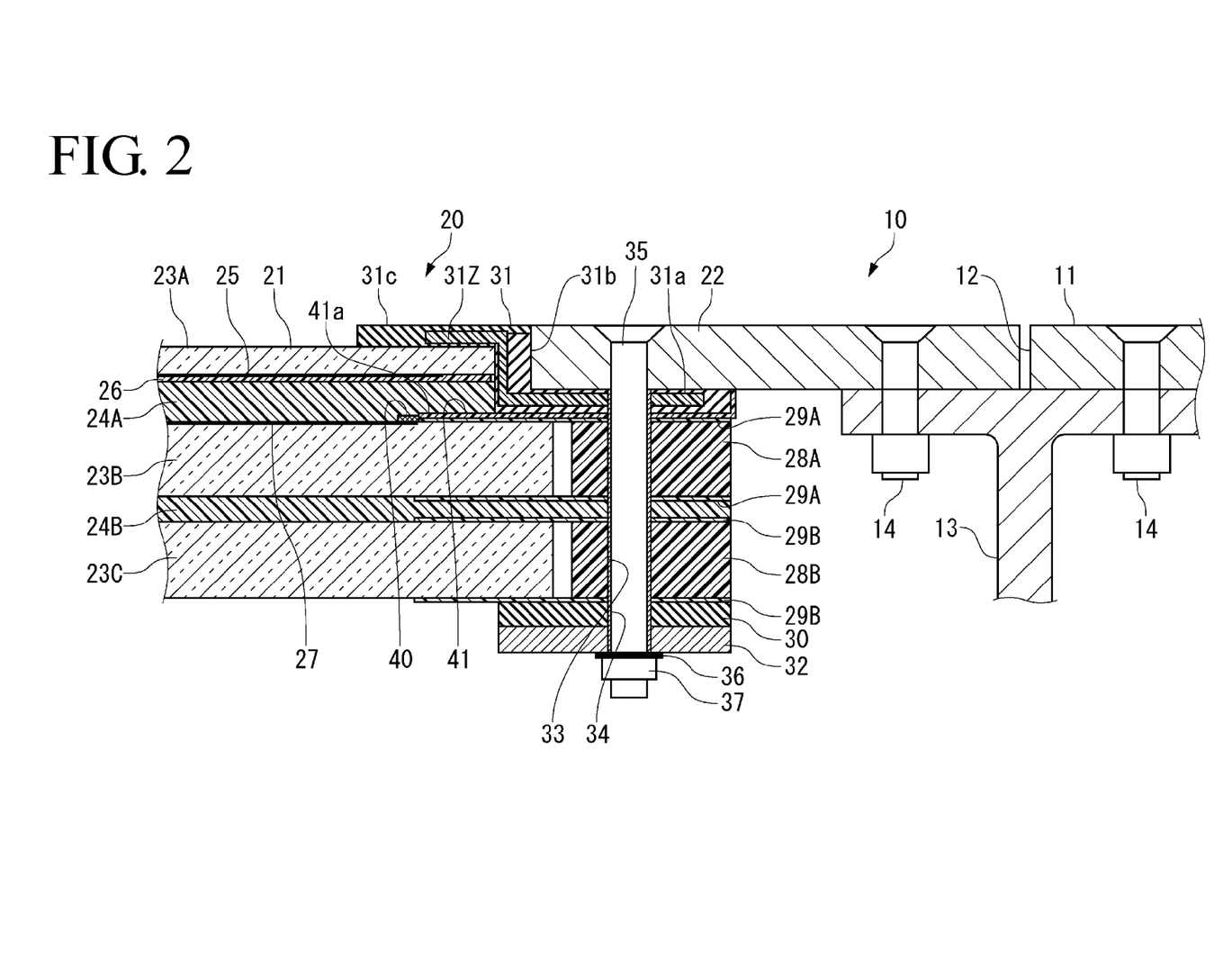
FIG. 2 is a sectional view showing a sectional structure of a cockpit window and its structure for mounting on an airframe.

As shown in FIG. 2, the cockpit window 20 is mounted on an opening 12 formed in a skin 11 configuring an airframe of the aircraft 10. The cockpit window 20 has a window part 21 and an outer retainer 22 surrounding the entire perimeter of the outer perimeter part of the window part 21.

The window part 21 is configured by laminating a plurality of, three in the present embodiment, window panels 23A to 23C. Here, in the cockpit window 20 as a main windshield, from among the window panels 23A to 23C, at least the window panel 23A, which is a surface layer facing the outside of the airframe of the aircraft 10, is made of glass. Furthermore, in the present embodiment, all of the window panels 23A to 23C are made of glass.

A resin film 24A is interposed between the window panels 23A and 23B and a resin film 24B is interposed between the window panels 23B and 23C, these resin films being made of PVB (polyvinyl butyral) or the like.

Also, between the window panel 23A and the resin film 24A, a heater layer 25 made of a conductive material configuring a heater for anti-icing is formed. This heater layer 25 is formed of a thin film made of a conductive material such as ITO, gold, silver, or others.

Furthermore, between the heater layer 25 and the resin film 24A, an intermediate layer 26 made of urethane or the like is provided.

Between the resin film 24A and the window panel 23B, an electromagnetic shield film 27 is interposed. The electromagnetic shield film 27 is a thin film formed of a conductive material such as ITO, gold, silver, or others.

On outer perimeter portions of the window panels 23B and 23C, spacers 28A and 28B having the same thickness as those of the window panels 23B and 23C, respectively, are provided so as to surround their entire perimeters. The spacers 28A and 28B are coupled to the window panels 23B and 23C with straps 29A and 29B, respectively, the straps being provided on front and back sides of each of the spacers 29A and 29B. Here, the spacers 28A and 28B and the straps 29A and 29B are made of fiber glass, for example.

And, the spacers 28A and 28B and the resin film 24B project to an outer perimeter side with respect to the window panel 23A, the resin film 24A, the heater layer 25, and the electromagnetic shield film 27.

Between the outer perimeter part of the window part 21 and the outer retainer 22 as described above, specifically, on an outer perimeter part of a surface of the window panel 23A and in a portion along a surface of the window panel 23B projecting to the outer perimeter side of the window panel 23A, a weather seal 31 made of a rubber-base material, resin, or others is provided. The weather seal 31 is provided so as to surround the entire outer perimeter part of the window part 21. The weather seal 31 has a crank-shaped sectional shape formed of a portion 31a along the spacer 28A and the window panel 23B, a portion 31b rising along outer perimeter surfaces of the resin film 24A and the window panel 23A, and a portion 31c along a surface of the window panel 23A. And, the weather seal 31 contains a Z retainer (a core material) 31Z also having a crank-shaped sectional shape. The Z retainer 31Z is made of a non-conductive material, and can be made of, for example, fiber glass.

In the portion projecting from the window panel 23A to the outer perimeter side, the weather seal 31, the spacers 28A and 28B, and the resin film 24B are interposed between the outer retainer 22 made of metal (a conductive material) and disposed outside and a sealant 30 and an inner retainer 32 disposed inside. And, a through hole 33 is formed in these outer retainer 22, weather seal 31, spacer 28A, resin film 24B, spacer 28B, sealant 30, and inner retainer 32. The through hole 33 has an inner perimeter surface in which a cylindrical sleeve 34 having a predetermined length fits, thereby regulating a space between the outer retainer 22 and the inner retainer 32.

And, with a fastener (a coupling member) 35 inserted in the through hole 33 and a washer 36 and a nut 37 mounted on a tip end part of a fastener 35 protruding from the inner retainer 32 to an inside of the aircraft, the weather seal 31, the window panels 23B and 23C, and the resin film 24B are fastened and fixed with the outer retainer 22 and the inner retainer 32.

The outer retainer 22 is fastened to a spar member 13 configuring the airframe of the aircraft 10 with a fastener member 14 such as a bolt or rivet. This spar member 13 is made of metal, which is a conductive material, with its one side having the skin 11 fixed thereto and the other side having the outer retainer 22 fixed thereto via a seal member.

Meanwhile, in the structure described above, the electromagnetic shield film 27 is formed on an inner side (a center side) of the window part 21 from the portion fastened with the outer retainer 22 and the inner retainer 32. This is to prevent the electromagnetic shield film 27 from falling off due to a fastening force by the outer retainer 22 and the inner retainer 32. If the electromagnetic shield film 27 is provided on an inner side from the portion fastened with the outer retainer 22 and the inner retainer 32, the fastening force by the outer retainer 22 and the inner retainer 32 does not directly act on the electromagnetic shield film 27.

Figure 3A:
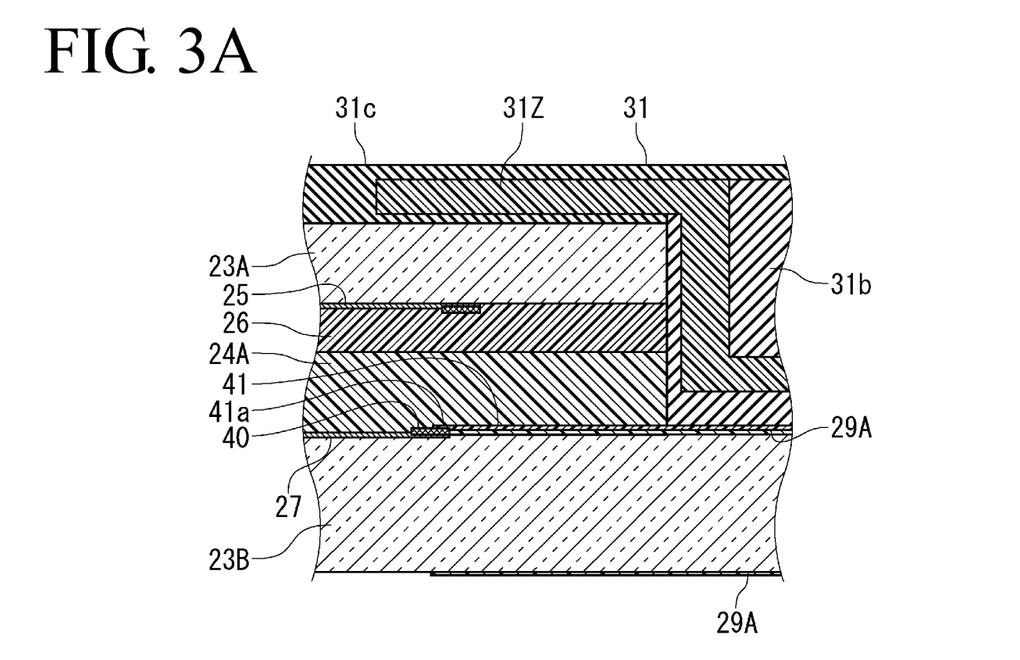
FIG. 3A is an enlarged sectional view of a connecting portion between an electromagnetic shield film and a conductive film.

As shown in FIG. 2 and FIG. 3A, a bus-bar-shaped connecting member 40 is provided on an outer edge part of the electromagnetic shield film 27 so as to surround its entire perimeter. This connecting member 40 is suitably formed of a plain braided wire, but may be formed of any other conductive material. This connecting member 40 is provided so as to be interposed between a surface of the electromagnetic shield film 27 and the resin film 24A, and is electrically connected to the electromagnetic shield film 27 by soldering or the like.

Also, on an outer perimeter side of the connecting member 40, a conductive film (a connecting film) 41 made of a material such as Ag, Al, Ni, or Cu and having flexibility is provided so as to surround the entire perimeter of the electromagnetic shield film 27. The conductive film 41 has one end 41a electrically connected to the connecting member 40. Furthermore, the conductive film 41 is interposed between a surface of the window panel 23B and the weather seal 31, and is led so as to protrude from the window part 21 to an outer perimeter side.

Figure 3B:
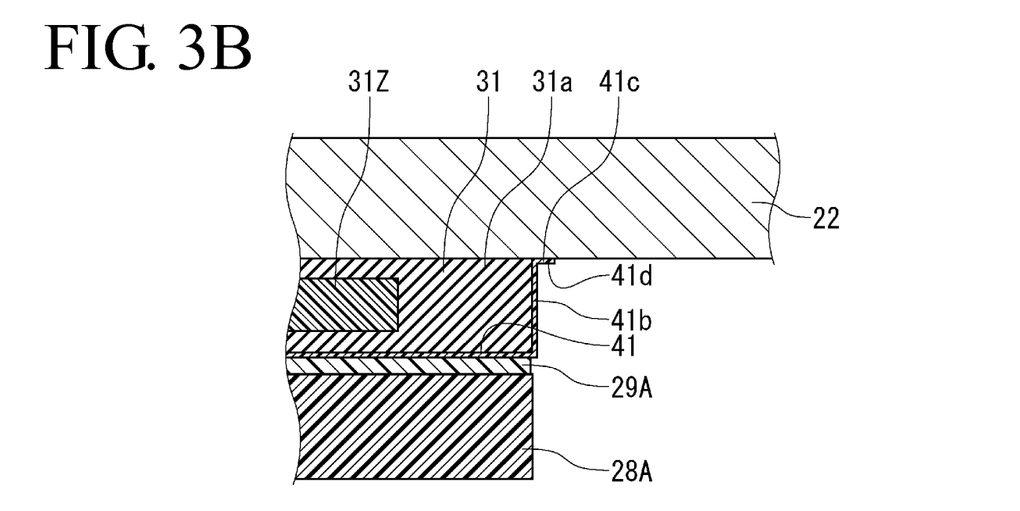
FIG. 3B is an enlarged sectional view of a connecting portion between the conductive film and an outer retainer.

As shown in FIG. 3B, in the conductive film 41, a protruding part (an intermediate part) 41b protruding from the window part 21 to an outer perimeter side is provided so as to be bent toward the outer retainer 22 side (an outer side of the airframe) and along the outer perimeter part of the weather seal 31. This protruding part 41b is provided so as to surround the entire perimeter of the weather seal 31 and have its tip end part 41c without a gap with respect to the outer retainer 22. When a corner of the weather seal 31 is shaped in a curve, the conductive film may be bent and cut and then another conductive film may be affixed to the outer perimeter part of the weather seal.

The protruding part 41b has a tub (another end) 41d formed at part in its perimeter direction so as to protrude therefrom. The tub 41d is bent along a back surface side of the outer retainer 22, and is electrically grounded (by bonding) to the outer retainer 22 with a fastener or the like. The grounded point is assumed to be a minimum point, but may be all around (peripheral) so as to improve shielding capability.

According to the structure described above, the window part 21 is provided with the electromagnetic shield film 27, and the conductive film 41 is provided between this electromagnetic shield film 27 and the outer retainer 22 made of a conductive material. This conductive film 41 is provided so as to protrude to an outer perimeter side of the window part 21 along the outer perimeter part of the weather seal 31 (the window part 21), and is electrically grounded to the outer retainer 22. With this, a film made of a conductive material can be formed without an electrical gap between the window part 21 and the outer retainer 22 and at a joint part with the skin 11 of the airframe, and electromagnetic noise can be reliably prevented from entering the cockpit.

At this time, since the conductive film 41 has flexibility, this film can be prevented from falling off even when the fastening force of the outer retainer 22 and the inner retainer 32 acts on the film. Also, the conductive film 41 having flexibility as described above can be easily handled even when a portion projecting to an outer perimeter side of the window part 21 is bent along the outer perimeter part of the weather seal 31.

As such, the electromagnetic shield film for preventing entrance of electromagnetic noise can be reliably and easily provided at low cost.

Note that the structure as described above can be changed as appropriate without departing from the gist of the present invention. A modification example is now described below. Here, in the modification example below, a structure common to the structure described above is provided with the same reference signs, and its description is omitted.

Figure 4:
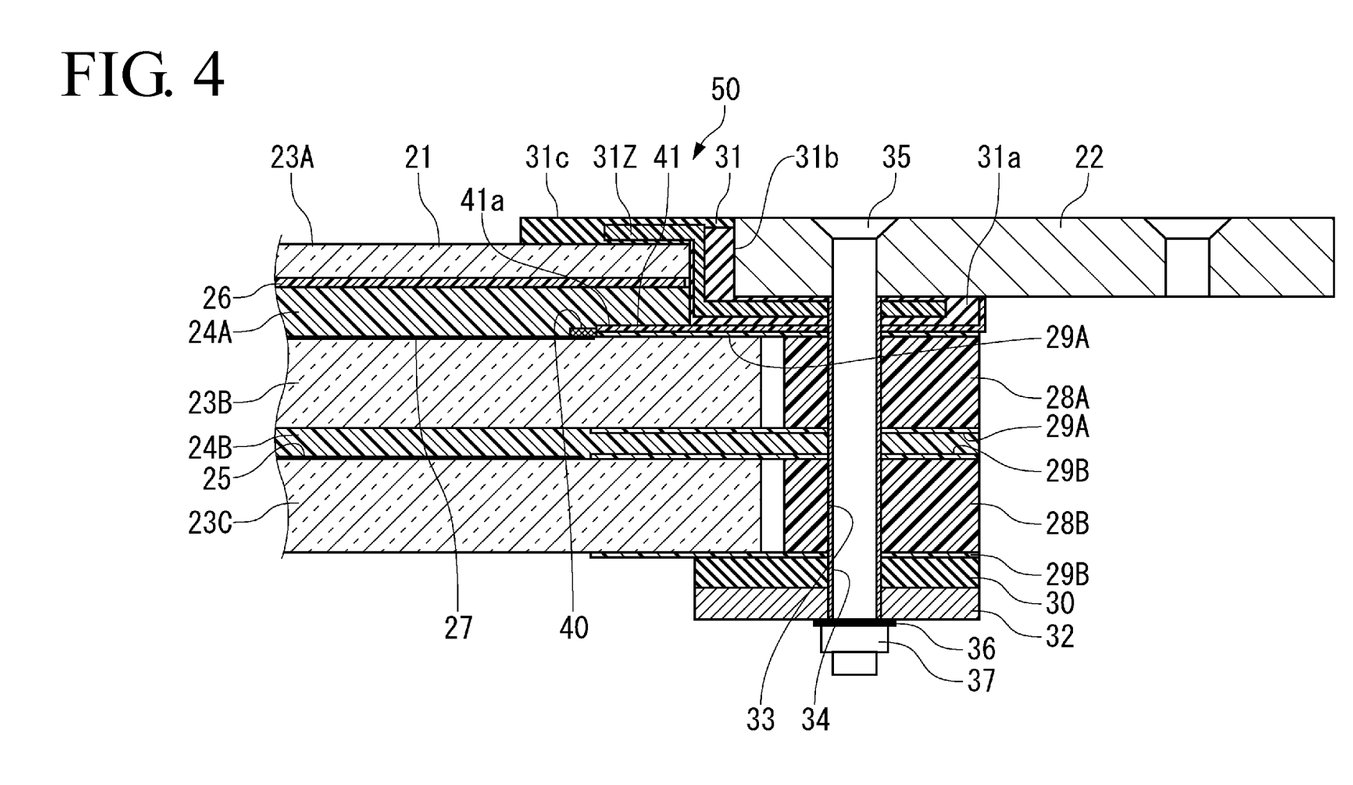
FIG. 4 is a view showing a sectional structure of a side window.

First, while the structure of the cockpit window 20 as a main windshield has been described above, the structure can also be applied to a side window 50 of the cockpit. FIG. 4 is a view showing the structure when the present invention is applied to the side widow 50 of the cockpit.

As shown in this FIG. 4, in the side window 50, the heater layer 25 is provided between the window panel 23C and the resin film 24B so as to be positioned further inside of the aircraft because it is used for de-fogging. The other structures are similar to those of the cockpit window 20 shown in FIG. 2.

With this, the conductive film 41 is provided to the electromagnetic shield film 27 via the connecting member 40 on the same layer and, furthermore, the conductive film 41 is led to the outer perimeter side of the weather seal 31 to be bent along the outer perimeter part of the weather seal 31 and is electrically grounded to the outer retainer 22. The structure in which an electromagnetic shield film is provided so as to prevent entrance of electromagnetic noise can be commonly used between the cockpit window 20 and the side window 50. With this, an increase in production cost can be suppressed.

Figure 5:
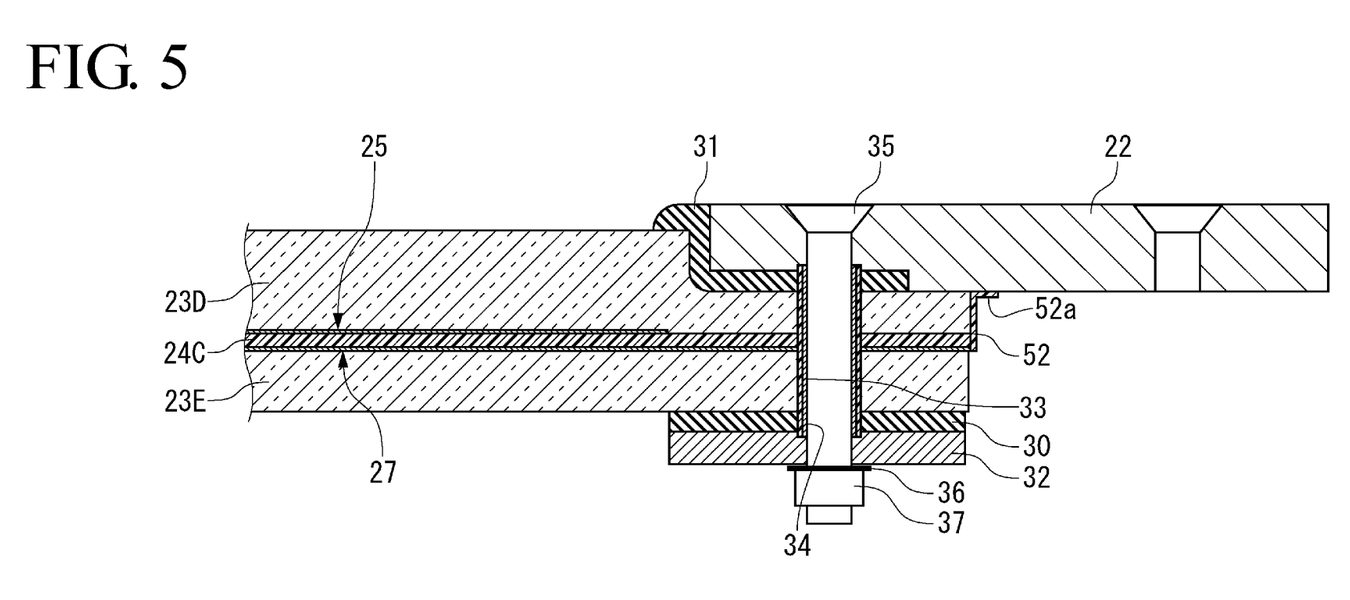
FIG. 5 is a view showing another example of the cockpit window.

Also, while the window panels 23B and 23C are made of glass in the structure described above, these can be made of acrylic. FIG. 5 is a view of an example in which window panels 23D and 23E are made of acrylic. In this case no spacers 28A and 28B are provided, and the through hole 33 is directly formed in the window panels 23D and 23E, which are fastened with the fastener 35.

In this case, the electromagnetic shield film 27 is interpositioned between the window panels 23D and 23E, and has its outer perimeter part connected to a conductive film (connecting film) 52. This conductive film 52 is provided along the outer perimeter part of the window part 21, that is, an outer perimeter surface of the window panel 23D, and is electrically grounded (by bonding) to the outer retainer 22 with tubs 52a provided at a plurality of locations in the circumferential direction.

Even in this structure, the gap between the electromagnetic shield film 27 and the outer retainer 22 can be filled with the conductive film 52, and therefore a similar effect as those shown in FIG. 2 and FIG. 4 described above can be achieved.

Note that in the embodiment described above, the number of window panels configuring the window part 21, the lamination structure, and materials can be changed as appropriate. Furthermore, the layer in which the electromagnetic shield film 27 is provided may be a layer other than the layer described above. Also in this case, the gap between the electromagnetic field film 27 and the outer retainer 22 can be filled with the conductive films 41 and 52.

Besides, the structure described in the above embodiment can be selected or can be changed as appropriate to another structure without departing from the gist of the present invention.

Reference Signs List

10 . . . aircraft, 11 . . . skin, 12 . . . opening, 13 . . . spar member, 14 . . . fastener member, 20 . . . cockpit window, 21 . . . window part, 22 . . . outer retainer, 23A to 23E . . . window panel, 24A, 24B . . . resin film, 25 . . . heater layer, 27 . . . electromagnetic shield film, 28A, 28B . . . spacer, 31 . . . weather seal, 32 . . . inner retainer, 33 . . . through hole, 34 . . . sleeve, 35 . . . fastener (coupling member), 40 . . . connecting member, 41, 52 . . . conductive film (connecting film), 41a . . . one end, 41b . . . protruding part (intermediate part), 41c . . . tip end part, 41d . . . tab (the other end), 50 . . . side window

The invention claimed is:

1. A cockpit window of an aircraft having an electromagnetic shield comprising:
a plurality of laminated transparent widow panels;
an inner-side inner retainer and an outer-side outer retainer provided to an outer perimeter part of the window panels, the retainers interposing the window panels and made of a conductive material;
a coupling member coupling the inner retainer and the outer retainer to each other;
a weather seal provided between the outer retainer and the window panels;
an electromagnetic shield film provided between two of the window panels that are opposed to each other and made of a conductive material;
a connecting film made of a conductive material and electrically connecting an outer perimeter part of the electromagnetic shield film and the outer retainer; and
a heater layer for anti-icing or de-fogging that is separate from the electromagnetic shield film and provided between the plurality of window panels.

2. The cockpit window of the aircraft having the electromagnetic shield according to claim 1, wherein the plurality of window panels comprise glass.

3. The cockpit window of the aircraft having the electromagnetic shield according to claim 1, wherein the connection film directly contacts the outer retainer.

4. The cockpit window of the aircraft having the electromagnetic shield according to claim 1, wherein the connection film is grounded to the outer retainer around an entire perimeter of the plurality of window panels.

5. The cockpit window of the aircraft having the electromagnetic shield according to claim 1, wherein there is no air gap between the plurality of window panels.

6. The cockpit window of the aircraft having the electromagnetic shield according to claim 1, wherein the electromagnetic shield film is provided on an inner perimeter side from a portion fastened by the inner retainer and the outer retainer and the connecting film is inserted in the portion.

7. An aircraft comprising the cockpit window having the electromagnetic shield according to any one of claims 1 to 6.

8. A cockpit window of an aircraft having an electromagnetic shield comprising:
a plurality of laminated transparent widow panels;
an inner-side inner retainer and an outer-side outer retainer provided to an outer perimeter part of the window panels, the retainers interposing the window panels and made of a conductive material;
a coupling member coupling the inner retainer and the outer retainer to each other;
a weather seal provided between the outer retainer and the window panels;
an electromagnetic shield film provided between two of the window panels that are opposed to each other and made of a conductive material; and
a connecting film made of a conductive material and electrically connecting an outer perimeter part of the electromagnetic shield film and the outer retainer, wherein the connecting film has one end interposed between two of the window panels that are opposed to each other to be electrically connected to the electromagnetic shield film and has another end connected to the outer retainer outside the window panels, and an intermediate part between the one end and the other end is along an outer perimeter surface of the window panels and is provided so as to fill a space between the outer perimeter part of the electromagnetic shield film and the outer retainer.

9. The cockpit window of the aircraft having the electromagnetic shield according to claim 8, wherein the connecting film and the electromagnetic shield film are connected via a band-shaped connecting member provided so as to surround the outer perimeter part of the electromagnetic shield film, the connecting member being made of a conductive material.

* * * * *